Oct. 20, 1925.  
W. M. MANSFIELD  
AUTOMOTIVE VEHICLE  
Filed June 14, 1920  
1,557,859  
5 Sheets-Sheet 1

Oct. 20, 1925.  
W. M. MANSFIELD  
AUTOMOTIVE VEHICLE  
Filed June 14, 1920

Inventor  
Warren M. Mansfield

Oct. 20, 1925.  
W. M. MANSFIELD  
AUTOMOTIVE VEHICLE  
Filed June 14, 1920 5 Sheets-Sheet 5  
1,557,859

Inventor  
Warren M. Mansfield.  
By:

Patented Oct. 20, 1925.

1,557,859

UNITED STATES PATENT OFFICE.

WARREN M. MANSFIELD, OF MOLINE, ILLINOIS, ASSIGNOR, BY MESNE ASSIGNMENTS, TO MOLINE IMPLEMENT COMPANY, A CORPORATION OF ILLINOIS.

AUTOMOTIVE VEHICLE.

Application filed June 14, 1920. Serial No. 388,988.

*To all whom it may concern:*

Be it known that I, WARREN M. MANSFIELD, a citizen of the United States, residing at Moline, Illinois, have invented certain new and useful Improvements in Automotive Vehicles, of which the following is a specification.

The invention relates to automotive vehicles.

It is concerned particularly with tractors of the friction drive type, although it is not necessarily limited to such machines.

Friction drives for automotive vehicles and other mechanism have heretofore been used but the difficulty with them has been that the frictional engagement of the parts has been difficult to maintain in such a way as to transmit the necessary driving forces. The necessity for efficient contact of friction driving parts is very great in a tractor because of the heavy load continuously transmitted.

One of the objects of the present invention is to provide an improved friction drive mechanism in which the frictional engagement of the parts is increased as the load being transmitted is increased.

Another object is to provide an improved tractor of the friction drive type.

A further object is to provide a tractor having improved means for control by means of lines.

Other objects and advantages of the invention will appear from the following description:

One embodiment of the invention is illustrated in the accompanying drawings in which.

Figure 1:
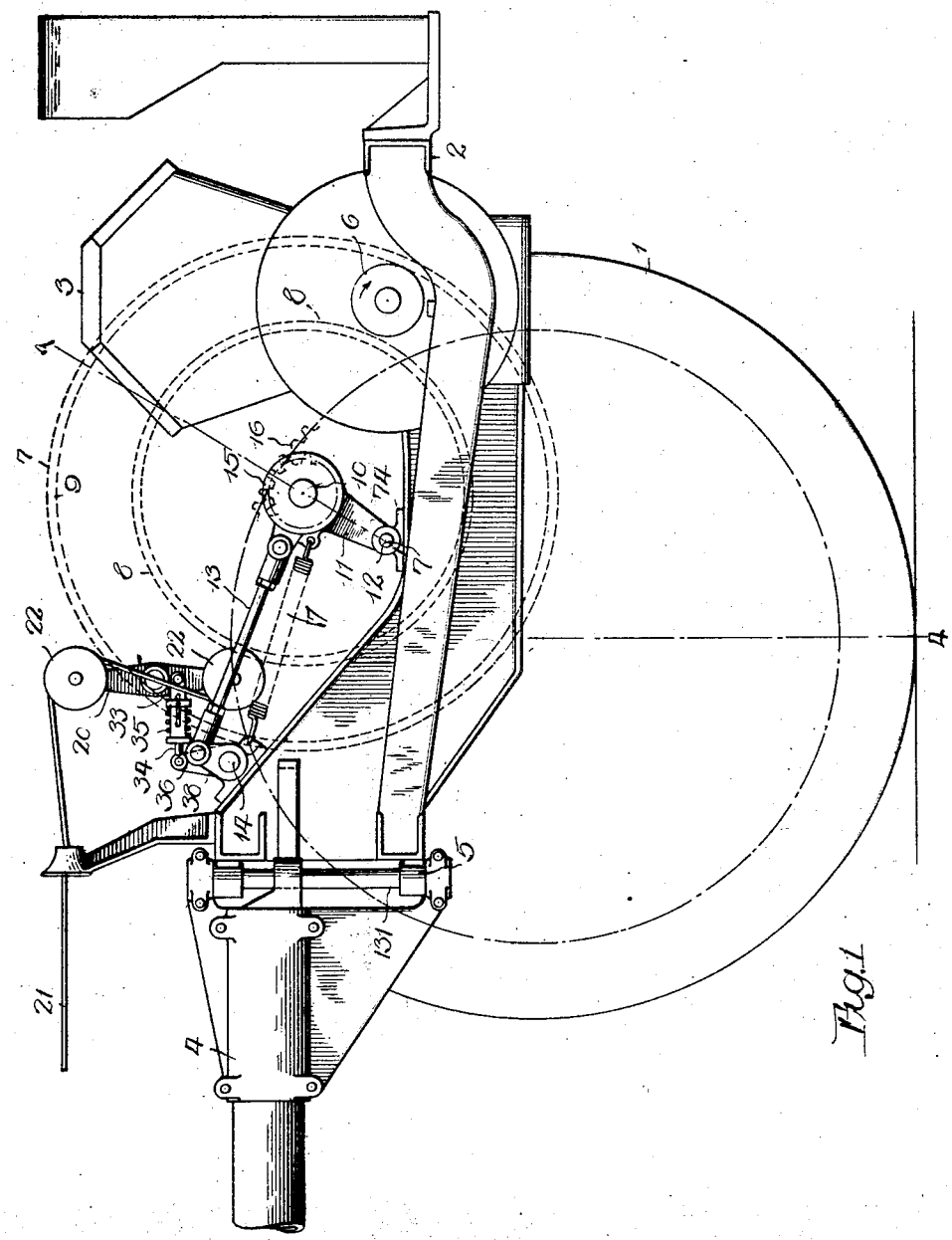
Figure 1 is a longitudinal section view on a vertical plane showing particularly the friction drive mechanism and the control therefor.

The invention is illustrated as applied to a two-wheel tractor of the unstable type. This tractor has two drive wheels 1 that carry a main frame 2 upon which is mounted a motor 3. Connected to the frame 2 is a coupling frame 4 by means of which the tractor is attached to the implement to be drawn. The coupling frame 4 is pivoted to the main frame so as to swing in a horizontal plane and mechanism hereinafter described is provided between the main frame and the coupling frame for moving them relative to each other for steering. It is to be understood that the invention may be used with other types of tractors than that illustrated.

The friction drive mechanism includes a driving friction member 6 continuously rotated in a clockwise direction in the embodiment illustrated by the motor 3, and an annular driven friction member 7.

Figure 3:
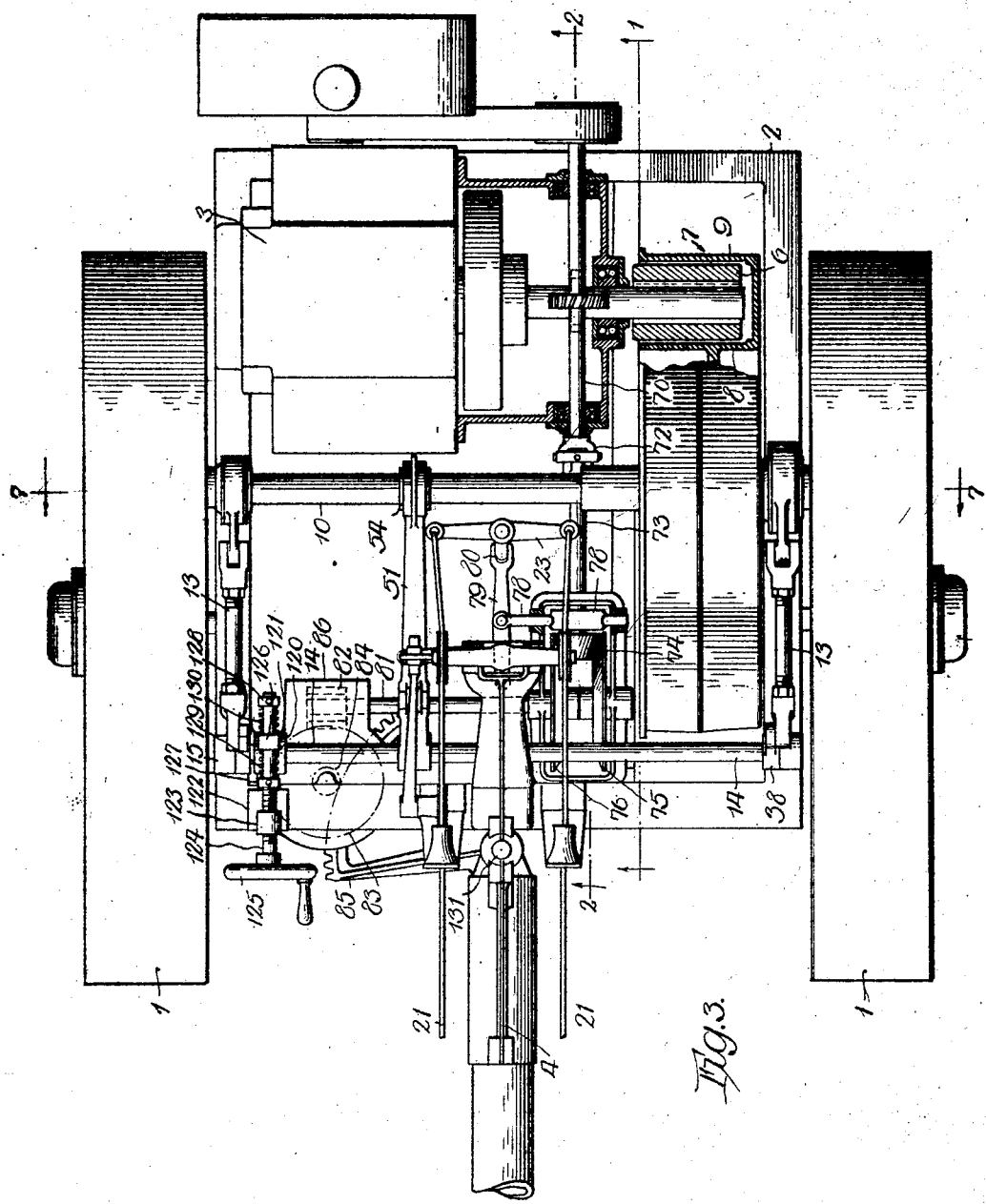
Figure 3 is a plan view.

The annular driven member 7 is U-shaped in cross section as shown in Figure 3 and the driving member 6 is positioned within the annular space thus provided. The diameter of the driving member 6 is less than the width of the space between the inner and outer walls 8 and 9 respectively of the annular driven member so that it can be held in neutral position out of contact with both walls or moved into contact with either of them.

Figure 4:
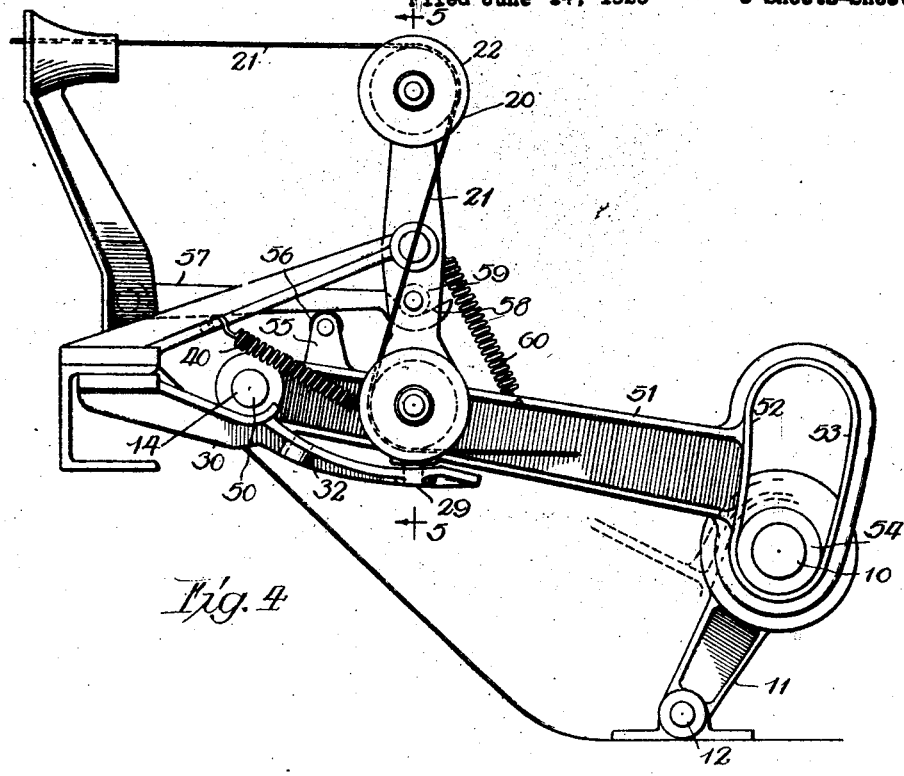
Figure 4 is a detailed side elevation of a portion of the control mechanism.

A reversal in the direction of driving the tractor mechanism is secured by having the driven member 7 arranged so that it may be moved to cause either of the friction surfaces 8 or 9 to contact the driving member 6. For this purpose the following construction is employed:

The driven member 7 is mounted upon a jack shaft 10 carried by arms 11, one at each end of the shaft, pivoted to the tractor frame at the points 12 as illustrated in Figures 1 and 4. The shaft 10 and its driven member 7 may be shifted to bring either of the driven friction surfaces 8 or 9 into contact with the driving member 6 by means of the rods 13, which are operated by means of control mechanism hereinafter described. There are two rods 13, one connected to the shaft 10 near each end thereof and joined by a connecting shaft 14. The control mechanism is connected to shaft 14 and movement is thus transmitted to both arms 13 simultaneously. This construction serves to brace the jack shaft 10 and causes the controlling forces to be exerted uniformly on both ends of the shaft.

The jack shaft 10 is preferably mounted in ball or roller bearings as shown in Figure 4 and carries at each end driving pinions 15 which mesh with the annular or bull gears 16 connected with the driving wheels 1 of the tractor. The tractor is thus driven by means of the motor through the driving member 6, the driven member 7 and the jack shaft 10 carrying the pinions 15 meshing with the bull gears 16. It will be understood that when jack shaft 10 is moved about its pivot points 12, the pinions 15 simply run along the bull gears a short distance without appreciably affecting the coincidence of the pitch circles of the pinions and bull gears.

When the control rods 13 are pushed forwardly the jack shaft 10 and driven member 7 are moved in a clockwise direction about pivots 12 and the inner friction surface 8 contacts the driving member 6. This causes the driven member 7 to rotate in a counter-clockwise direction corresponding to a backward movement of the tractor. When the control rods 13 are pulled backward, the jack shaft 10 and driven member 7, move in a counter-clockwise direction about pivot 12 causing the surface 9 to engage driving member 6, thereby rotating the driven member 7 in a clockwise direction and causing the tractor to move forward.

The frictional contact between the driving member 6 and the driven member 7 increases in proportion to the forces necessary to turn the tractor wheels. This will be clear by observing that the driving member 6 when rotating in a clockwise direction tends to rotate the driven member 7 in a clockwise direction which in turn rotates the pinions 15 and the bull gears 16 in a clockwise direction. The tractor wheels, however, offer resistance to motion, so that a reaction is set up which tends to move the jack shaft 10 counter-clockwise about its pivots 12. In other words, the first action is not to turn the tractor wheels but to cause the jack shaft to rotate counter-clockwise about the pivots 12. The greater the reaction of the tractor drive wheels, the greater will be the force tending to move the jack shaft 10 counter-clockwise about the pivot 12 and this reaction is directly transmitted to the driven member 7 to move it bodily counter-clockwise to build up the contact pressure between its surface 9 and the driving disc 6.

The same reaction takes place when the mechanism is driven in the opposite direction. In that case, the jack shaft 10 will have been moved by the control rods 13 in a clockwise direction so as to bring the friction surface 8 of member 7 into contact with the clockwise rotating disc 6. The driven member 7 will be rotated in a counter-clockwise direction and the pinions and bull gears will be rotated in the same direction. The reaction of the drive wheels and bull gears will then be in a clockwise direction tending to move the jack shaft and driven member 7 bodily in a clockwise direction, thereby increasing the frictional contact between the driving member 6 and the surface 8 of the driven member 7.

It will thus be observed that a friction drive has been provided in which the frictional contact pressure between the driving and driven parts is varied in proportion to the driving forces transmitted. The reaction caused by the resistance of the tractor or other mechanism causes the frictional contact pressure to build up rapidly after the discs are once brought into engagement.

When traveling forward over rough ground the jarring of the tractor tends occasionally to throw the driven member 7 forward and out of contact with the driving member 6 and this tendency is slightly assisted by the spring 35 (Fig. 1). This tendency is overcome by the driving reaction only when power is transmitted from the motor to tractor wheels 1. When the tractor runs in a rut or otherwise runs ahead of motor 3, there is little or no power transmitted from the motor to tractor wheels 1 and therefore, there is no reaction tending to hold the frictions in contact. At such times the jar is liable to break the contact and spring 35 will tend to prevent recontacting between the driving member 6 and annular drum 9.

In practical construction, the links 33 and 34 can telescope sufficiently so that the spring 35 can hold the outer wall 9 out of contact with driving disc 6. A spring 17 is used to overcome the force of spring 35 and remake the contact between the driving disc 6 and the outer wall 9. After this contact is again made, the contact pressure will rapidly build up by reason of the reaction referred to above. This action could take place instantaneously so that there would be no slowing down in the speed of travel.

The control mechanism for shifting the position of the jack shaft 10 through the medium of rods 13 comprises in general a control head 20 that is manipulated by means of lines 21, extending over pulleys or sheaves 22 and connected to the ends of a steering control lever 23, shown in Figure 3, the manipulation of which will hereinafter be described in detail. The control head is normally latched in the neutral position shown in Figure 1 in which position, the jack shaft 10 is held so that the driving disc 6 does not contact either of the surfaces 8 or 9 of driven disc 7.

The arrangement of the control is such that, when only one line is pulled the control head is not unlatched but the steering mechanism is operated. When both lines are pulled simultaneously, the first action is to unlatch the control head. If the lines are then held taut but slacked a little, the control head is moved in a clockwise direction under the influence of a spring or similar biasing device, and the control mechanism is operated to cause the tractor to go forward. If, after the two lines are given the initial pull for unlatching the control head, they are pulled back further, the head will be rotated in a counter-clockwise direction to operate the control mechanism to cause the tractor to move backward. The mechanism for accomplishing these results is as follows:

The control head 20 is shown in detail in Figures 4, 5, 6 and 10. It carries 4 pulleys or sheaves 22. The two upper ones are fastened to shafts 25 free to rotate in bearings in the control head 20. The 2 lower sheaves are fastened to similar shafts 25 free to rotate in a movable head 26, pivotally mounted on the sliding pin 28 which is biased into the position shown on the drawings by a spring 27. The sliding pin 28 is reduced in diameter at the lower end to co-operate with notches 29 and 32 in keeper plate 30 fixed to the frame. The control lines 21 pass over the tops of the upper pulleys and around the bottoms of the lower pulleys. When only one line is pulled the movable head 26 swings into a diagonal position shown in Figure 6.

A pull on both lines first tends to slide the head 26 upwardly against the force of spring 27. The strength of the spring is such that an initial pull or jerk on both lines will easily unlatch the rock arm but when only one line is pulled, no movement will take place. The character of the parts contributes to assist in this action because, when one line only is pulled, the tendency is to move the sliding head to a diagonal position and lock it in place instead of sliding it.

The upward movement of the sliding head 26 is limited by the engagement of the head with the surfaces 31 on a part of the control head but the movement is sufficient to unlock the head. When such movement is completed, the force of the pull on both lines, if continued, will move the rock arm in a counter-clockwise direction.

To drive forward both lines 21 are pulled back slightly to unlatch the control head and then slackened so that the head will be moved by a spring or other biasing means in a clockwise direction. This may be easily done by giving the lines a light pull and then releasing them. The light pull will unlatch the control head and, when the lines are released, the spring will move it before it has an opportunity to again become latched in neutral position. When the control head has been moved to its forward position, the latch pin 28 engages a second notch 32 in the keeper plate, so as to lock the control head in forward position. It will be apparent that the control head may be moved from forward to neutral position by simply pulling the lines; the first pull unlatching it and a continued pull moving it to neutral position.

The motion of the control head is transmitted to the control rods 13 through two telescoping links 33 and 34, biased apart by a spring 35. One of these links is connected to the rock arm, and the other to a crank 36 on the shaft 14. This shaft carries two additional cranks 38 to which the control rods 13 are connected. When the control head moves in a clockwise direction, the shaft 14 is rotated to move the control rods in a counter-clockwise direction, which in turn moves the jack shaft 10 in a counter-clockwise direction. This is the movement for driving a tractor forward. When the control head is moved in a counter-clockwise direction, a reverse movement of the other parts takes place, and the tractor is driven backward. The telescoping connection between the links 33 and 34 is for the purpose of permitting movement of the control head to neutral position irrespective of whether or not the jack shaft is moved by the control head to its neutral position. This relative movement of the parts serves to put the power releasing mechanism into operation as will be hereinafter described.

To go backward the lines are pulled backward sufficiently to first unlatch the control head, and then move it in a counter-clockwise direction to the limit of its movement. It is rarely necessary to drive the tractor backward for more than a limited period, and therefore no provision has been made for locking the control head in the backward position. Instead the operator must hold the control head in that position against the tension of spring 40 by means of the lines 21.

The backward or counter-clockwise movement of the control head is transmitted to the control rods 13 by means of the links, cranks and shaft hereinbefore described, it being understood that the backward movement of the control head moves these parts in the reverse direction from the forward movement of the control head and serves to throw surface 8 of the driven friction member 7 into engagement with the driving disc 6, so as to drive the mechanism backward.

The control mechanism above described serves not only to move the jack shaft 10 so as to bring the friction discs into engagement for driving the tractor either forward or backward but it also acts to return the parts to neutral position.

When the tractor has been going forward and it is desired to stop, a pull on the lines for the purpose of returning the members 6 and 7 to neutral, operates to separate these discs.

When the tractor has been moving backward and it is desired to return to neutral, the force tending to return the parts to neutral and disengage the discs is the force exerted by the spring 40 connected to the control head.

When traveling forward with a tractor of medium size the forces holding the frictions in contact and resulting from the reaction set up in the drive mechanism, is very large. Therefore, it is not ordinarily practical to rely on a pull of control lines 21 to break the contact.

In order to insure absolute control, a power operated mechanism has been provided which automatically operates to disengage the discs if they do not readily separate when the control mechanism is operated by hand. This mechanism is shown in detail in Figure 4 and will now be described.

Pivoted at the point 50 on the frame is an arm 51 having a T-head provided with two cam surfaces 52 and 53 surrounding a circular cam 54 on the jack shaft 10. The cam surfaces 52 and 53 converge toward the bottom of the T-head and are separated toward the top a sufficient distance so that the cam roller 54 does not touch either cam surface, even though the shaft 10 is swung about its pivot 12 when shifted for controlling the friction drive.

Figure 5:
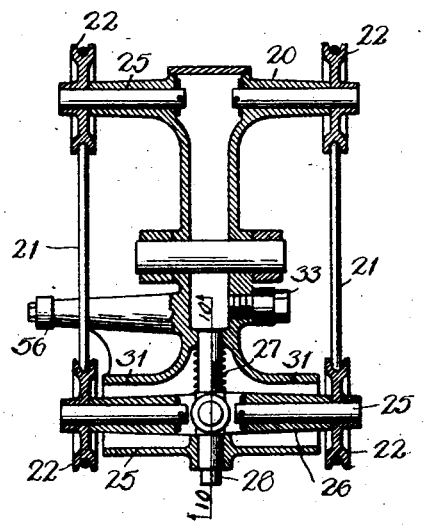
Figure 5 is a section on the line 5—5 of Figure 4.
Figure 6:
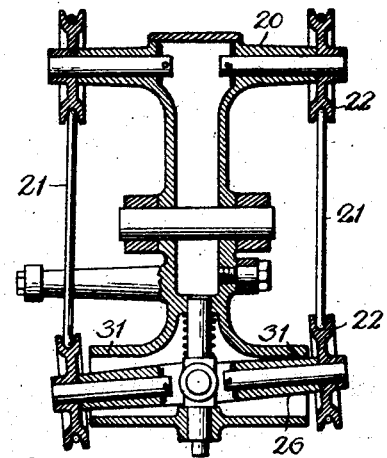
Figure 6 is a section similar to Figure 5, but shows the movable head in position for steering.

The arm 51 has a projection 55 carrying a cam roller 56 which engages the under surface of a latch arm 57 pivoted to the frame of the tractor. The outer end of the latch arm 57 is notched at 58 as shown in Figure 5 and normally engages a cam roller 59 on the control head 20. A spring 60 attached to the arm 51 and to the control head bracket normally biases the arm 51 to the full line position shown in Figure 4 in which all parts are in neutral position.

When the control head 20 is moved in either direction to shift the friction drive to operate the mechanism forwardly or rearwardly, the cam 59 rolls out of the groove 58 and biases the latch arm 57 against the arm 51 and thereby swings said arm in a clockwise direction about its pivot. The T-head end of the arm is thus moved down so that the cam 54 on jack shaft 10 will not touch either of the cam surfaces as the jack shaft is shifted. However, when the control head 20 is moved back to neutral position, the cam roller 59 rolls into the notch in the latch arm 58 and the spring 60 pulls the arm 51 counter-clockwise. One of the surfaces 52 or 53 is thus brought into contact with the cam roller 54 on the rotating jack shaft 10.

When the tractor has been going forward, the operation of the power mechanism for returning the jack shaft to neutral is as follows:

Jack shaft 10 will have been moved in a counter-clockwise direction in order to have driven the tractor forward and the shaft itself will be rotating in a clockwise direction. The control head will be in its clockwise position and the arm 51 will be pushed down to the dotted line position illustrated in Figure 4. The first movement for returning to neutral is a pull on the lines for rotating the control head in a counter-clockwise direction to neutral position. This movement tends to move the jack shaft 10 clockwise, but it is assumed in this case that the jack shaft will not move. The control head nevertheless is moved to neutral position because the spring 35 in the connecting links permits this movement even though the jack shaft does not move. Consequently the control head will become latched in neutral position and cause the cam roller 59 to roll into notch 58 on latch lever 57, thereby permitting the spring 60 to pull the arm 51 upwardly. As the arm moves upwardly the cam surface 52 of the T-head will engage the rotating cam 54 on the rotating jack shaft, because in the forward-going position of the parts the jack shaft will be in its counter-clockwise position. The jack shaft is rotating clockwise, and as the cam surface 52 engages the rotating cam, the tendency will be for the cam to ride down on the cam surface, increasing the frictional engagement of the parts as the action takes place and prying or forcing the jack shaft clockwise as the T-head is forced upwardly. In other words the rotation of the jack shaft itself tends to force it to a neutral position.

When the tractor has been moved backward and it is desired to return to neutral but the friction discs stick, the action is as follows:

The control head 20 will be in its counter-clockwise position, the arm 51 will have been forced downward and the jack shaft 10 will be in its furthermost clockwise position. As the lines are slacked to permit the control head to be returned to neutral by the spring 40, the tendency is for the control head to move the jack shaft in a counter-clockwise direction about pivots 12. If the jack shaft sticks however, the control head will nevertheless move to neutral position because the telescoping links 33 and 34 permit such movement with very little resistance. The control head thus becomes locked in neutral position, permitting the cam roller 59 to roll into notch 58 in the lever, thereby permitting the spring 60 to move the arm 51 with its T-head upwardly. As the T-head moves upwardly its cam surface 53 comes into contact with the rotating cam 54 on the jack shaft 10, it being understood that the jack shaft is in its furthermost clockwise position. The jack shaft is rotating, in this case, in a counter-clockwise direction and as the cam surface 53 engages it, the tendency will be for the cam roller to roll down on the cam surface increasing the frictional contact as it goes and forcing itself counter-clockwise to neutral position at the same time that it forces the T-head arm upwardly.

This mechanism is entirely automatic, that is, it operates automatically in case the jack shaft does not move to neutral position when the controls are moved to neutral position.

Figure 2:
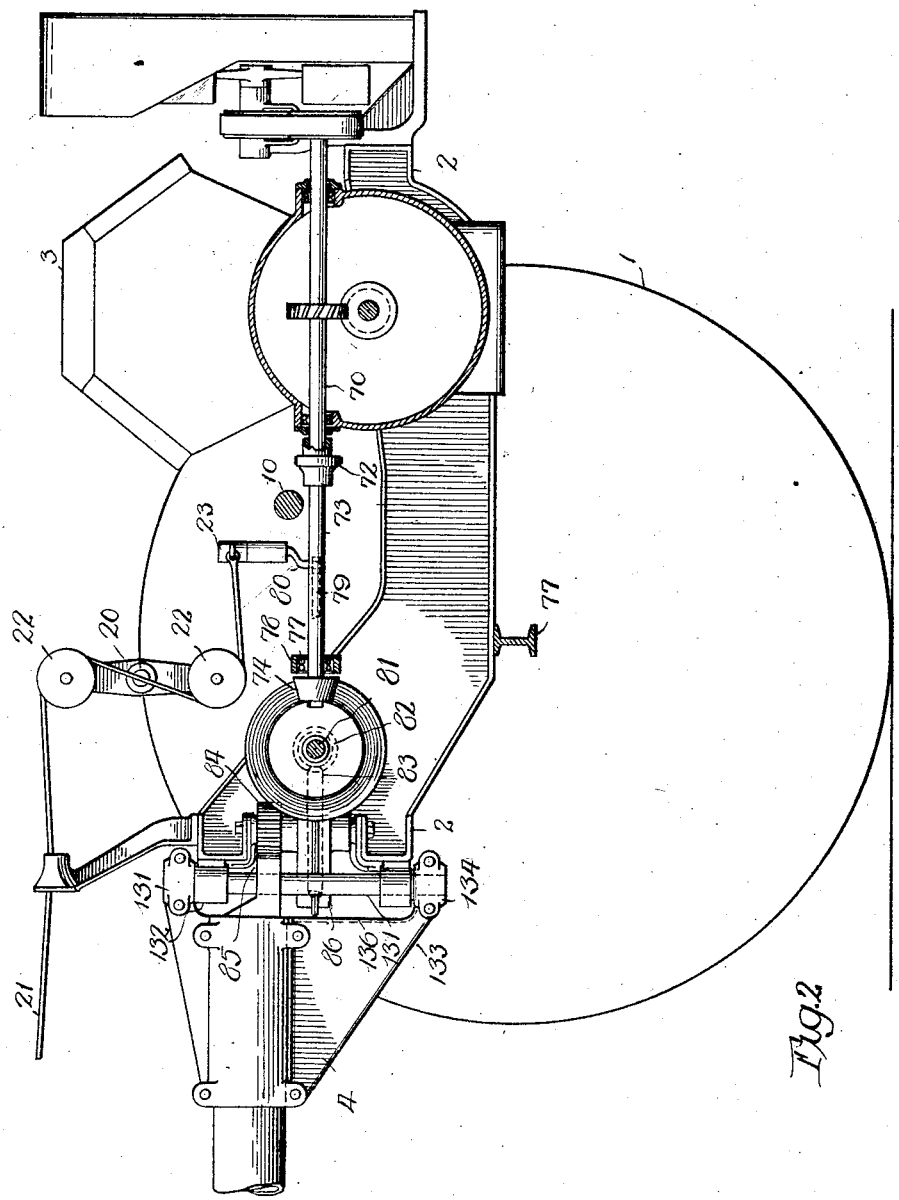
Figure 2 is a similar view with some parts omitted, in order to illustrate more clearly the steering mechanism.

The steering mechanism is illustrated most clearly in Figures 2 and 3. It is power operated and includes a shaft 70 driven by suitable means from the engine. This shaft 70 extends rearwardly and is provided with a universal coupling 72 for permitting lateral movement of the rear shaft section 73. The rear shaft section carries a cone 74 which operates between two cone discs 75 and 76 shown in Figure 3, and the shaft rotates in a bearing 77 carried by a sliding arm 78 connected to a lever 79 which in turn is pivoted to the tractor frame. The free end of the arm 79 is bifurcated and a crank 80 connected to the control lever 23 operates in this bifurcation. It will be apparent that whenever either of the lines 21 is pulled, the control lever 23 will be rocked about its pivot which in turn will move the lever 79 and sliding arm 78 together with the shaft section 73 and the cone 74. In this manner the cone 74 may be moved into engagement with either of the cone discs 75 or 76, depending upon which of the lines 21 is pulled. The arrangement is such that when the right hand line is pulled, the cone 74 is moved into engagement with the disc 76 and when the left hand line is pulled, the cone is moved into engagement with the disc 75.

The discs 75 and 76 are fixed to a shaft 81 which is journaled on suitable bearings on the frame and carries on its end a worm gear 82 meshing with a worm wheel 83 which is connected to a spur pinion 84 that in turn meshes with a tooth sector 85. A suitable housing 86 encloses the worm and the worm wheel and carries the bearings for supporting the worm shaft. The sector 85 is rigidly fixed to the coupling frame 4 so that whenever the sector is moved, the frame is swung about its pivot on the main frame and in this manner the tractor is steered by power.

The shaft sections 70 and 73 are continuously driven in the same direction and it will be apparent that when the right hand line 21 is pulled the shaft 81 and the sector 85 will be rotated by means of the cone and discs in one direction and when the left hand line is pulled, the shaft 81 and the sector will be moved in the other direction. The arrangement is such that when the right hand line is pulled, the tractor is steered to the right and when the left hand line is pulled, the tractor is steered to the left.

As hereinbefore explained, the operation of the steering lever 23 by means of the lines does not interfere with the operation of the controlling head 20. When only one of the lines is pulled, the control head is not moved but the steering control lever is moved. When both of the lines are pulled, the control head 20 is moved but the steering control is not moved.

Figure 7:
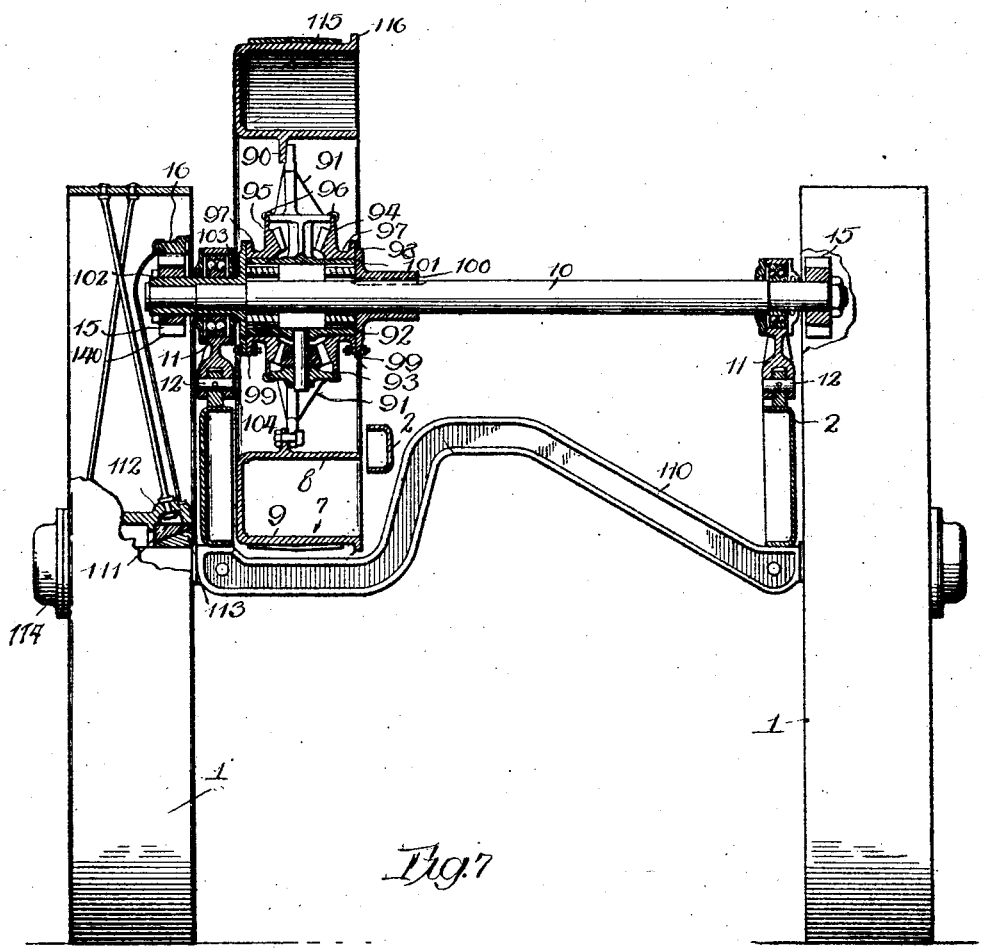
Figure 7 is a section on the line 7—7 of Figure 1, showing particularly the differential driving mechanism.

The differential driving connection between the friction wheel 7 and the jack shaft 10 is illustrated in detail in Figure 7.

The driven friction wheel 7 is annular in shape and the differential is positioned in its hollow interior. The inner annular rim has projections 90 formed on its interior and to these projections is bolted the differential housing 91 which has a hub portion 92. The housing is preferably mounted on ball or roller bearings as shown so that there will be a very small loss of power due to friction.

The differential housing carries a plurality of bevel pinions 93 each of which meshes with the bevel gears 94 and 95 mounted on the hub of the differential housing. Rings are provided which serve to hold the grease or oil within the housing and to prevent dust from entering.

Each of the bevel gears 94 and 95 has a hub 97 extending outwardly and at the end of each is a flange 98 with sprocket teeth 99 thereon.

The bevel gear 94 is connected to the jack shaft 10 by means of a coupling member 100 which is keyed to the shaft and which has a flange 101 provided with teeth arranged to coincide with the teeth 99 on the flange 98 of the bevel gear 94. A sprocket chain of suitable size is wound about the sprocket teeth and the ends of the chain connected. This serves to connect the bevel gear 94 to the shaft 10.

The bevel gear 95 is coupled with the driving pinion 140 by means of a coupling member 102, which is journaled to rotate freely on the jack shaft 10. This coupling member is provided with a flange 103 having teeth arranged to coincide with the teeth on the flange of the bevel gear hub 95. A sprocket chain 104 is wound about these teeth, and its ends connected together so as to connect the bevel gear with the coupling member and the driving pinion.

It will thus be seen that the differential permits both the drive wheels to be driven in the same direction, and also permits movement of one relative to the other, as is necessary in turning corners.

The tractor frame is preferably carried by a beam or axle member 110 which is bent upwardly near the center to allow it to clear corn or other plants when the tractor is used with cultivators. The ends of this beam serve as axles for the drive wheel, each wheel being provided with a cone-shaped axle box 111 which is pressed into the drive wheel hubs 112. The axle carries a conical member 113 corresponding in shape to the axle box 111 and fixed to the axle. By tightening a nut 114 on the end of the axle the wear may thus be taken up.

The driven friction member 7 also serves as a belt pulley for driving a belt when the tractor is used to operate a thresher, corn sheller and the like. For this purpose the periphery of the driven member has a crown face 115 and a flange 116. When used as a pulley the driven member idles on the jack shaft and revolves relative to each of the coupling members 100 and 102, such movement being permitted by removing the sprocket chains and prior to using the disc for a belt pulley.

It is necessary in belt work to hold the friction member in contact with the driving friction member 6 and while this might be done by a pull of the belt, it is desirable to provide other means for maintaining this frictional contact and for this purpose the construction shown in Figure 3 is used.

The shaft 14 connecting the two control rods 13 carries an upstanding arm 120 having a boss 121 at its upper end. The tractor frame carries a bracket 122, the upper end of which has a tapped boss 123 in which is mounted the screw 124 operated by hand wheel 125. The forward end of the screw passes through a hole 126 in the boss 121 on the upstanding arm 120 and the screw also carries two collars 127 and 128 between which and the boss 121 are positioned springs 129 and 130. When the hand wheel 125 is operated, the screw will travel either forwardly or back and compress the corresponding spring which will rotate the shaft 14 and operate the control rods 13 in either direction desired. This operation will take place regardless of the fact that the control head 20 is in neutral position, because of the relative movement of the parts permitted by the telescopic link connection 33—34.

Figure 8:
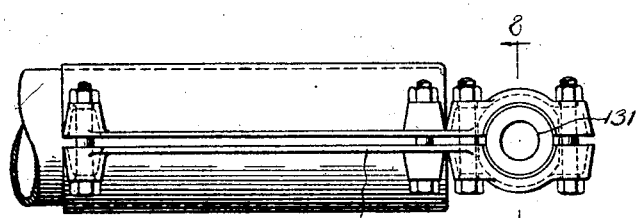
Figure 8 is a detailed view of the tractor yoke.
Figure 9:
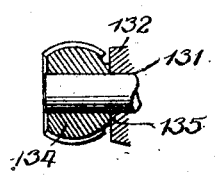
Figure 9 is a section on the line 8—8 of Figure 8.
Figure 10:
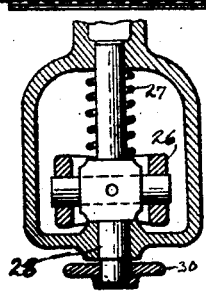
Figure 10 is a section on the line 10—10 of Figure 5.

The coupling frame 4 of the tractor is preferably connected to the main frame by a bolt 131 mounted in brackets 132 attached to the main frame, such bolt passing through the brackets and a yoke 133 having two self-aligning bearings 134, each provided with a boss 135 seated on the brackets 132 to take the end thrust. The yoke is preferably made of two sheet metal stampings shown in detail in Figure 8. These are formed with spherical housing portions for fitting around the self-aligning bearings 134. This construction makes it relatively easy to line the yoke bearings with the brackets 132 by simply placing the self-aligning bearings 134 on the bolt 131, and then clamping the two sheet metal parts of the yoke together by means of bolts or other fastening devices. The sheet metal portion of the yoke may be stiffened at its inner edge 136 and at the points where the bolts are used by drawing the metal to either side of the main surface of the yoke.

It is to be understood that the structures shown are for the purpose of illustration only, and that other structures may be devised which come within the spirit and scope of the appended claims.

What I claim is:

1. A tractor having a power plant, drive wheels, driving pinions for said wheels mounted so as to swing bodily about an axis parallel to the wheel axis, and driving connections between the power plant and the driving pinions, said connections including a driving friction member and a driven friction member, both of said members being positioned to rotate in planes parallel to the plane of the drive wheels, said driven friction member being mounted so as to swing bodily about the same axis as the driving pinions.

2. A tractor having two forward drive wheels, driving pinions for each wheel mounted on a common axis and arranged to swing bodily about an axis parallel to the axis of the wheels, a motor, and driving connections between the motor and the pinions including a driving friction member and a driven friction member, said members being positioned to rotate in planes parallel to the plane of the drive wheels, said driven friction member being mounted to swing bodily about the same axis as the pinions and between the two driving wheels.

3. A tractor having a power plant, drive wheels, driving mechanism between the power plant and driving wheels including a clutch mechanism, means for manually operating the clutch to connect and disconnect the driving mechanism, and power operated means for automatically disengaging the clutch if it should not be disengaged by operation of the manually operable means.

4. A tractor having a power plant, drive wheels, driving connections between the power plant and drive wheels, manually operable means for connecting and disconnecting the driving mechanism, and power operated means arranged to automatically disconnect the driving mechanism in case the same is not disconnected by an operation of the manually operable means.

5. A tractor having a power plant, drive wheels, driving connections between the power plant and drive wheels, manually operable means for connecting and disconnecting the driving mechanism, and power operated means arranged to automatically operate in case the manually controlled means does not disconnect the driving connection, to forcibly disconnect the same by power.

6. A tractor having a power plant, drive wheels, and driving connections between the power plant and drive wheels, rein controlled means for connecting and disconnecting the driving mechanism, and power operated means for automatically and forcibly disconnecting the driving mechanism in case the same is not disconnected by the rein controlled means.

7. A tractor having a power plant, drive wheels, driving connections between the power plant and drive wheels including friction members arranged so that the contact between them is increased as the load to be transmitted is increased, manually operable means for engaging and disengaging the friction members, and power operated means for forcibly disengaging the friction members in case they are not disengaged by an operation of the manually operable means.

8. A tractor having a power plant, drive wheels, driving connections between the power plant and driving wheels including friction members arranged so that the reaction of the drive wheels increases the frictional contact of the members as the load to be transmitted increases, rein controlled means for engaging and disengaging the friction members, and power operated means arranged to automatically disengage the friction members when the same are not disengaged by an operation of the manually operable means.

9. A tractor having a power plant, drive wheels, driving connections between the power plant and drive wheels including a clutch mechanism, rein controlled means for connecting and disconnecting said clutch mechanism, and power operated means for automatically disconnecting the clutch mechanism in the event it is not disconnected by an operation of the rein controlled means.

10. A tractor having a power plant, drive wheels, driving connections between the power plant and drive wheels including a clutch, rein controlled means for connecting and disconnecting the clutch, and power operated means rendered active by an operation of the rein controlled means to automatically disconnect the clutch in case the same is not disconnected by the operation of the rein controlled means.

11. A tractor having a power plant, drive wheels, and driving connections between the power plant and drive wheels including a driving friction member and a driven friction member, said driven friction member being adapted to serve as a belt pulley and being arranged so that it may be moved into and out of contact with the driving friction member so as to be driven in either direction without driving the tractor.

12. A tractor having a power plant, drive wheels, and driving connections between the power plant and drive wheels including a clutch mechanism one member of which is adapted to serve as a belt pulley, and means for connecting and disconnecting the clutch mechanism so as to drive the belt pulley member in either direction without driving the tractor.

13. A tractor having a power plant, drive wheels, and driving connections between the power plant and drive wheels including a driving friction member and a driven friction member arranged to serve as a belt pulley and normally connected to drive the drive wheels but arranged so that it may be disconnected from said drive wheels, and means for moving the driven friction member into and out of engagement with the driving friction member so that it may be driven in either direction.

14. A tractor having a power plant, drive wheels, driving mechanism between the power plant and drive wheels including a clutch, steering mechanism, power operated means for disengaging the clutch, and rein controlled mechanism arranged to steer the tractor by a pull on either line and so that the clutch may be engaged and disengaged for driving the tractor forward and backward or stopping it by a pull on both lines, said mechanism also rendering said power means active to automatically return the clutch to neutral if the same is not returned by an operation of the reins.

15. A tractor having a power plant, drive wheels, driving connections between the power plant and drive wheels including a driving friction member and a driven friction member, power operated means for disengaging said members, steering means, and rein controlled mechanism arranged to operate the steering means by a pull on either rein, to connect and disconnect the friction members by a pull on both reins to thereby drive the tractor forward and backward and to stop it and to render the power operated means active to automatically disengage the friction members in case they are not disengaged by the operation of the reins.

16. A tractor having a friction driving mechanism forced into driving engagement by the reaction of the drive wheels, rein controlled mechanism for engaging and disengaging said driving mechanism, power operated means rendered active by movement of the rein controlled means from driving position to neutral for automatically and forcibly disengaging the friction driving mechanism if the same is not directly disengaged by an operation of the rein controlled means.

17. A tractor having a driving mechanism including a friction member pivoted so that it may be moved into and out of engagement with a driving friction member to be driven in either direction, rein controlled means for moving the driven member into and out of engagement with the driving member, and power operated means for forcibly disengaging the friction members if the same are not disengaged by an operation of the rein controlled means.

18. Rein controlled mechanism for tractors including a control head pivoted near its center and having means adjacent one end over which reins may pass, and means adjacent the other end under which reins may pass so that a pull on the reins will tend to swing the control head about its pivot, a latch mechanism for the control head, the means on one end of the control head being connected with the latch mechanism so that when both reins are pulled the latch mechanism is operated to release the control head, but, when only one rein is pulled, the latch mechanism is not operated.

19. A tractor having drive wheels, a power plant, a driving mechanism including friction driving means rotatable on a fixed axis and in a plane parallel to the plane of the drive wheels, said friction means being driven continuously by the power plant, a friction driven member mounted to rotate in a plane parallel to the plane of the drive wheels, means for mounting the driven member so that it may be moved bodily in the plane of its rotation parallel to the drive wheels into and out of engagement with portions of the friction driving means moving in opposite directions to thereby enable the driven member to be optionally driven in opposite directions, driving connections between the driven friction member and the tractor drive wheels, and line-controlled mechanism for moving the driven friction member bodily into and out of engagement with the driving friction means.

20. A tractor having drive wheels, a power plant, a friction driving mechanism including means rotated continuously by the power plant about a fixed axis substantially parallel to the axis of the drive wheels, a friction driven member extending over the driving means and mounted to rotate about an axis substantially parallel to the axis of the drive wheels, said driven member being movable bodily in the plane of its rotation so that it may be moved into and out of frictional engagement with portions of the driving means moving in opposite directions to thereby be optionally rotated in either direction, driving connections between the driven member and the tractor drive wheels, and line controlled mechanism for moving the driven member into and out of engagement with the driving means.

21. Rein controlled mechanism for controlling the steering of a tractor and the starting, stopping, and driving of the same in either direction by moving a friction member into and out of engagement with another friction member, comprising a control head normally latched in position and arranged so that it will remain latched when either line is pulled separately but will be unlatched when both lines are pulled together, means controlled by the control head and cooperating with one of the friction members for utilizing the power of the friction member to disengage said member from its driving position, said means being rendered active when the control head is moved from either of its driving positions to neutral without at the same time moving the friction member to neutral, whereby the friction member is forcibly moved to neutral position by its own power.

In testimony whereof, I have affixed my signature.

WARREN M. MANSFIELD.